W. ROHM.
HEATING ARRANGEMENT FOR SILOS.
APPLICATION FILED MAR. 5, 1915.
1,168,424.
Patented Jan. 18, 1916.
2 SHEETS—SHEET 1.
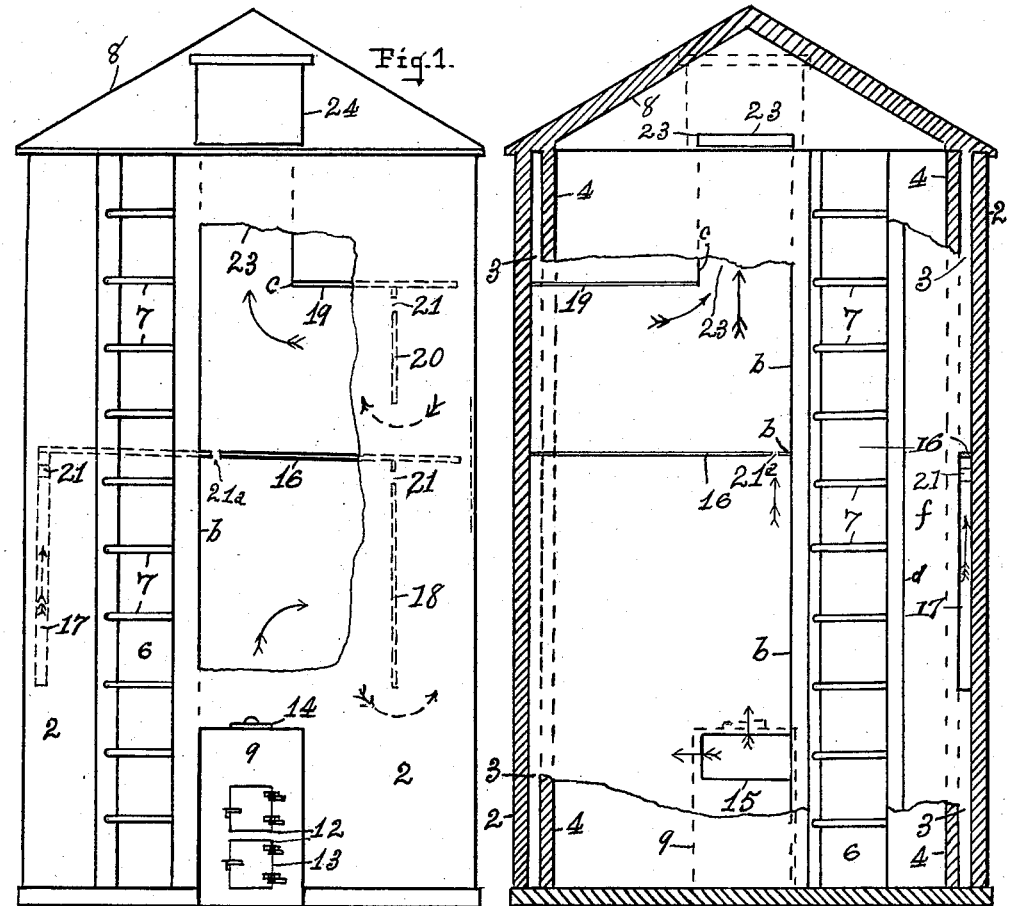
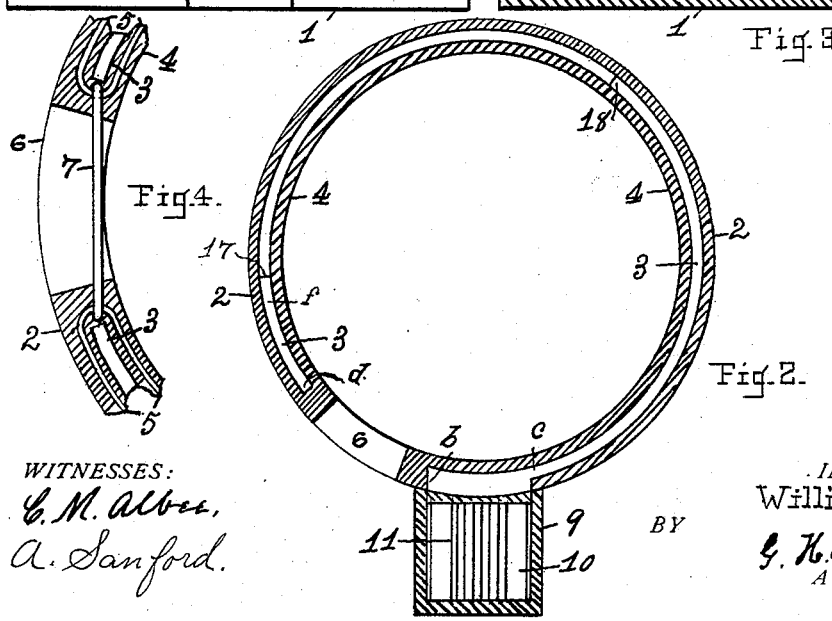
WITNESSES:
C. M. Albee,
A. Sanford.
INVENTOR.
William Rohm.
BY G. H. Albee.
ATTORNEY.

UNITED STATES PATENT OFFICE.

WILLIAM ROHM, OF APPLETON, WISCONSIN.

HEATING ARRANGEMENT FOR SILOS.

1,168,424.  Specification of Letters Patent.  Patented Jan. 18, 1916.

Application filed March 5, 1915. Serial No. 12,339.

*To all whom it may concern:*

Be it known that I, WILLIAM ROHM, a citizen of the United States, residing at Appleton, in the county of Outagamie and State of Wisconsin, have invented a new and useful Heating Arrangement for Silos, of which the following is a specification.

My invention relates to a hollow wall silo and may be made of two walls of concrete, of cement blocks or brick, as preferred, with a space between said two walls and a heater outside of the silo arranged to deliver heat to the space between said walls for circulation around the silo. There are horizontally and vertically arranged baffle plates of such number and location as the diameter and height of the silo requires for the successful heating of the contents of the silo, two horizontal and three vertically arranged baffle plates being shown in the present case.

The invention is shown in the accompanying drawing, in which,—

Figure 6:
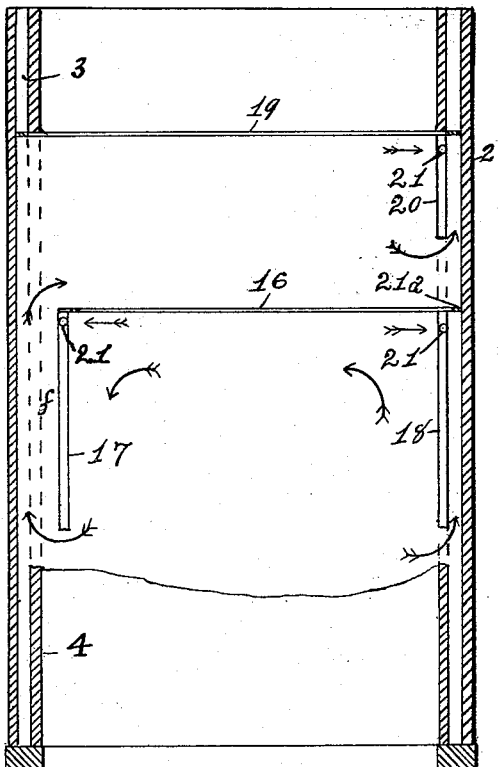
Figure 8:
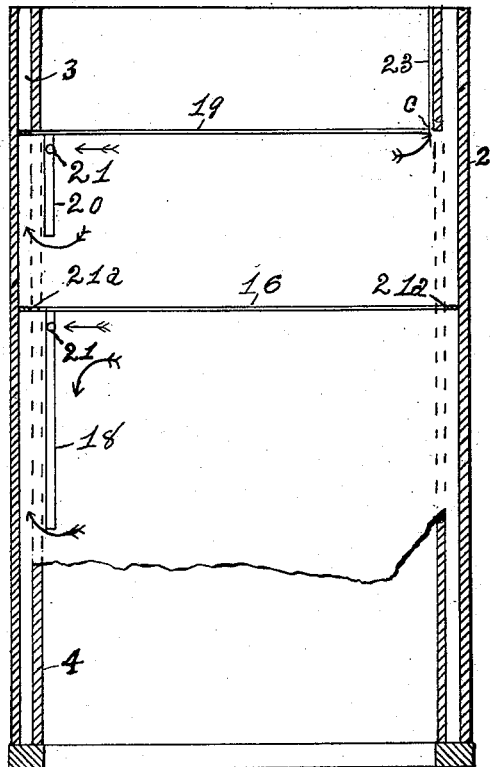
Figure 5:
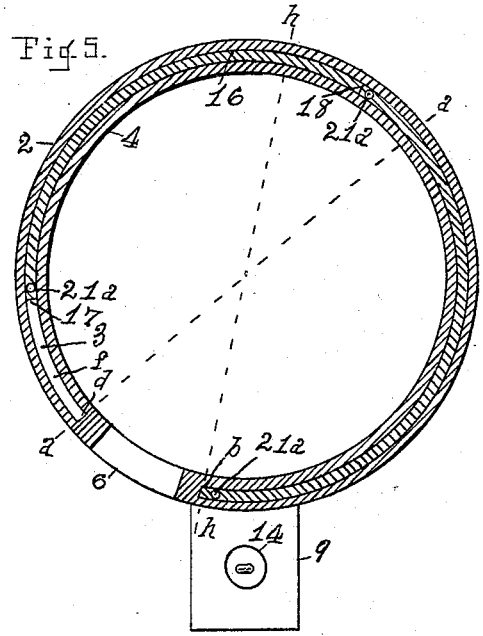
Figure 7:
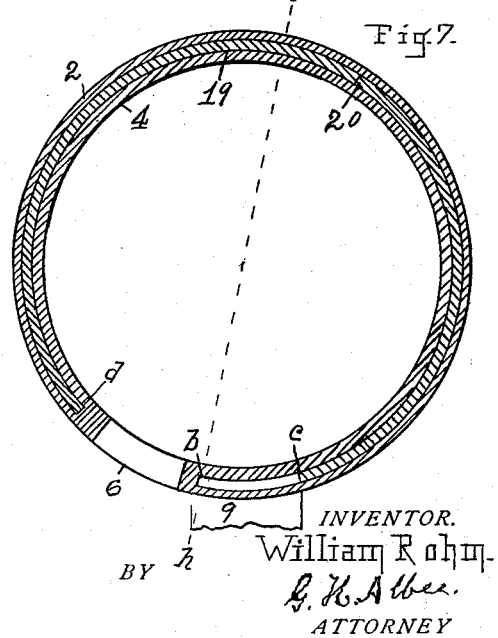

Figure 1 is a side elevation of a silo with my invention applied to it. Fig. 2 is a plan of the same in section. Fig. 3 is a vertical section of the silo diametrically thereof as it appears in looking toward the heater in Fig. 2. Fig. 4 is a detail in horizontal section of the door opening. Fig. 5 is a horizontal section across the silo through the lower baffle plate. Fig. 6 is a vertical section, the roof being omitted, of the silo as it appears in looking to the left of the line $a, a,$ of Fig. 5. Fig. 7 is a horizontal section of the silo upon the line through the upper baffle plate. Fig. 8 is a vertical section of the silo, the roof being omitted, as it appears in looking to the right of the line $h, h,$ of Figs. 5 and 7.

Similar numerals and letters indicate like parts in the several views.

1, indicates the silo foundation; 2, the outside silo wall; 3, a space between the walls; 4, the inside wall; 5, tie rods laid in the wall in building it; 6, a door opening; 7, tie rods across the door opening and connecting with the rods 5. These tie rods 5, are only shown in Fig. 4 on account of the small scale of the other figures and are not an element of this invention.

8, denotes the silo roof, and 9, a heater inclosure which may be formed of the same material as that of the silo walls.

10, is an iron heater, and a fire pot therein; 11, fire pot grate; 12, door, opening to the fire pot; 13, ash pit door; 14, cover through which to feed in fuel; 15, opening from the space 3 to the upper part of the heater through the wall 2, and through which opening the gaseous products of the fuel combustion pass into and around the space 3. At a suitable distance above the heater opening 15, a baffle plate 16, is secured in the wall when building, it may be of sheet metal and be 14 feet more or less above the lower end of the silo. The baffle plate 16 commences at $b$, Figs. 2 and 5, and extends around and across the space 3 to the point 17, where a baffle plate 17 is arranged vertically and forming a flue $f$, which leads upward to the space around the silo above the plate 16.

17 indicates in Figs. 2 and 5, both the termination of the horizontal baffle plate 16 and the vertical baffle plate 17, which connects with the plate 16 and extends downward from it and is plainly shown as being so connected in Fig. 6. Another baffle plate 18, is arranged vertically between the plate 17 and the heater which depends from the plate 16. A baffle plate 19 is arranged horizontally over the space 3 at a distance of 10 feet, more or less, above the plate 16. This second horizontal plate starts near the door jamb at $d$, at the left of the door, see Figs. 1, 2, 3, 7 and 8, and ends at a distance of 3 feet, more or less, from the right hand side of the door in Fig. 2, at $c$, see Figs. 2, 7 and 8, from which point a flue 23 connects the space below the plate 19 with the chimney 24. From the horizontal plate 19, a drop or vertical baffle plate 20, is arranged, it extending downward to within 3 feet, more or less, of the plate 16.

Each vertical plate is provided with a flue 21, and the horizontal plate 16 with a flue 21ª, at one or more points, see Figs. 1, 3, 5, 6 and 8, for the passage of hot air for assisting the draft of the chimney 24. Without these flues the draft in the usual size of silo, on account of the distance to be drawn and the obstructions of the several baffle plates would be insufficient to meet the requirements demanded of the heater. These flues 21 are quite small, they being for preventing cold air spaces in the corners under the horizontally arranged baffle plates, and are not of sufficient area for allowing but a percentage of the flow of heated air to pass through, the greatest bulk passing around under the vertically arranged plates 17, 18 and 20, in order to reach the chimney flue. The same restricted area is applied to the flue 21ª, for a like reason. They all serve to equalize the temperature throughout the silo. It should be understood that the number of baffle plates, both those horizontally and those vertically arranged, and their position circumferentially may be changed without departing from the principle and scope of this invention.

The outer wall in Fig. 1 and inner wall in Figs. 3, 6 and 8 are broken away, the position of the inner wall being shown in dotted lines. The essential features about this invention are, that there is an air space between the outer and inner wall of suitable width, that there are baffle plates arranged partly around and across said space, that there are vertically arranged baffle plates and flues through the baffle plates and that there is a heater in communication with the aforesaid spaces.

Having described my invention, what I claim and desire to secure by Letters Patent, is,—

1. In combination with a silo having an outer and an inner wall with an air space between said walls, a heating system for heating the contents of the silo consisting of a heater located at the lower end of said air space at one side of the silo door and its combustion chamber in communication with the aforesaid air space, a baffle plate arranged horizontally around the silo and across said air space and extending from over the heater exit flue to within a suitable distance of the opposite side of said door, and a flue from said point leading upward and in communication with the outer air through a chimney in the silo roof.

2. In combination with a silo having an outer and an inner wall with an air space between said walls, a heating system for heating the contents of the silo consisting of a heater located at the lower end of said air space at one side of the silo door and its combustion chamber in communication with the aforesaid air space, a baffle plate arranged horizontally around the silo and across said air space and extending from over the heater exit flue to within a suitable distance of the opposite side of the door, a second baffle plate arranged horizontally around the silo across said air space commencing at the aforesaid opposite side of the door and ending at a distance from the first mentioned door side substantially equal to the width of the combustion escape space from the heater to the air space between the silo walls, a vertically arranged baffle plate depending from each horizontal baffle plate at a suitable distance between its ends, and a flue opening from the space upon one side of a vertical baffle plate through the plate to the opposite side thereof near its upper end, and a chimney flue from the last mentioned end of said upper baffle plate to the outer air.

3. In combination with a silo having an outer and an inner wall with an air space between said walls, a heating system for heating the contents of the silo consisting of a heater located at the lower end of said air space at one side of the silo door and its combustion chamber in communication with the aforesaid air space, a baffle plate arranged horizontally around the silo across said air space and extending from over the heater exit flue to within a suitable distance of the opposite side of the door, a vertically arranged flue at the end of said baffle plate connecting the space below to the space above said plate, a second horizontally arranged baffle plate across said air space commencing at the aforesaid opposite side of the door and ending at a distance from the first mentioned door side substantially equal to the width of the combustion escape space from the heater to the air space between the silo walls, and a chimney flue from the last mentioned end of said baffle plate to the outer air.

4. In combination with a silo having an outer and an inner wall with an air space between said walls, a heating system for heating the contents of the silo consisting of a heater located at the lower end of said air space at one side of the silo door, and its combustion chamber in communication with the aforesaid air space, a baffle plate arranged horizontally around the silo across said air space and extending from over the heater exit flue to within a suitable distance of the opposite side of the door, a vertically arranged flue at the end of said baffle plate connecting the space below to the space above said plate, a second horizontally arranged baffle plate across said air space, commencing at the aforesaid opposite side of the door and ending at a distance from the first mentioned door side substantially equal to the width of the combustion escape space from the heater to the air space between the silo walls, a flue of small area through the first mentioned baffle plate and a chimney flue from below the upper horizontally arranged baffle plate to the outer air.

WILLIAM ROHM.

Witnesses:
C. M. ALBEE,
JOHN E. WILLIS.